United States Patent
Boult (10) Patent No.: US 7,773,784 B2
(45) Date of Patent: Aug. 10, 2010

(54) REVOCABLE BIOMETRICS WITH ROBUST DISTANCE METRICS

(75) Inventor: Terrance Edward Boult, Monument, CO (US)

(73) Assignee: University of Colorado Board of Regents, Boulder, CO (US)

( * ) Notice: Subject to any disclaimer, the term of this patent is extended or adjusted under 35 U.S.C. 154(b) by 691 days.

(21) Appl. No.: 11/665,524

(22) PCT Filed: Oct. 14, 2005

(86) PCT No.: PCT/US2005/037490
§ 371 (c)(1),
(2), (4) Date: Apr. 12, 2007

(87) PCT Pub. No.: WO2006/044917
PCT Pub. Date: Apr. 27, 2006

(65) Prior Publication Data
US 2009/0022374 A1    Jan. 22, 2009

(51) Int. Cl.
G06K 9/00    (2006.01)
H04L 9/00    (2006.01)
G06F 21/00    (2006.01)

(52) U.S. Cl. .............. 382/124; 382/115; 380/277; 713/186
(58) Field of Classification Search .............. 382/115, 382/124; 380/277; 713/186
See application file for complete search history.

(56) References Cited

U.S. PATENT DOCUMENTS
5,999,622 A * 12/1999 Yasukawa et al. .............. 705/51

OTHER PUBLICATIONS

Ratha et al., Enhancing security and privacy in biometrics-based authentication systems, 2001, IBM Systems Journal, vol. 40. No. 3, pp. 614-633.*

* cited by examiner

Primary Examiner—John B Strege
(74) Attorney, Agent, or Firm—Dale B Halling (57) ABSTRACT

Techniques, systems and methods relating to cryptographically secure revocable biometric signatures and identification computed with robust distance metrics are described. Various biometric cryptographically secure revocable transformation approaches are described that support a robust pseudo-distance computation in encoded form, thereby supporting confidence in verification, and which can provide for verification without identification.

21 Claims, 4 Drawing Sheets

The basic transform, with the translation and scaling module.

Figure 1: The penalty in the "similarity function."

Figure 2 Different user transforms being applied to 4 raw data samples.

Figure 3: The basic transform, with the translation and scaling module.

Figure 4: Variation on basic transform, incorporating a passcode.

Figure 5: Example of a Robust Distance Metric.

Figure 6: Storage of transform and revocable signature data in a database.

Figure 7: Storage of transform and revocable signature data in a database and a smart-card.

Figure 8: Storage of transform and revocable signature data in a database, incorporating a PIN.

Figure 9: Example fingerprint minutia.

REVOCABLE BIOMETRICS WITH ROBUST DISTANCE METRICS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND

1. Field

Embodiments of the present invention generally relate to biometric signatures and identification. More specifically, embodiments of the present invention seek to provide means for revocable biometric signatures and identification using robust distance metrics.

2. Description of the Related Art

Biometrics generally are methods of identifying or verifying the identity of a person based on a physiological characteristic. Examples of the features measured are: face, fingerprints, hand geometry, palmprints, iris, retinal, vein, and voice comparison. To be most effective, features to be measured should be distinctive between people and have a sufficient level of invariance over the lifetime of the person and sensor variations. Biometric technologies are becoming the foundation of an extensive array of highly secure identification and personal verification solutions. Throughout this discussion we use the term probe to mean biometric data being tested, and gallery to mean the collection of biometric data to which the probe is being compared.

Biometric signatures, the derived features which are actually matched, typically range from tens of bytes to over a megabyte, and thus have an advantage in that their information content is typically much higher than a password. Modern biometrics are generally based on a "similarity matching" using a pseudo-distance metric being computed between the biometric signatures. The ability to compute distances is important since intra-subject variations may sometimes be larger than inter-subject variations. Thus, systems often provide "top-N" matching, i.e. given the probe find the closest N examples in the gallery, to improve the chance the subject is identified, or use calibrated pseudo-distances in verifying the subject, accepting the probe's claim as verified only if and only if the pseudo-distance between the probe and the claimed gallery entry is below a threshold.

A number of systems have been designed that presume a biometric that consistently maps a biometric property of an individual to a unique key, such that no two individuals have the same key. While various attempts have been made, often clouded in cryptographic obscurity, such "perfect biometrics" do not yet exist. Biometrics suffer from variations in sensors, measurements, and alignment, and most suffer from actual variation or drift of the biometric signature itself. Intra-subject variation is therefore non-trivial. Most biometric systems depend on "similarity matching," with higher "similarity" generally providing higher confidence in the match. This then supports different levels of false alarm or rejection risk decisions at different levels of confidence and for different applications.

There are a number of privacy concerns with biometric systems. First, there are the concerns that have been raised about the storage of biometric information. A person's biometric data is significantly invariant over time, and thus cannot be changed. This invariance serves as a key attribute, but also a liability. If the database or other repository is compromised, or a person's biometric data otherwise falls into the wrong hands, the loss is permanent. With techniques that allow reproduction, such as literally "printing" fingerprints from images of a fingerprint [2], the potential loss is substantial. The compromised biometric cannot be "replaced." The concept of biometric signatures that can be canceled or revoked, and then replaced with a new signature, will provide privacy while not compromising security.

There are other privacy concerns as well. There are concerns about such private data being required and stored in many locations by many different government or other agencies. This is especially an issue with fingerprints because of their association with law enforcement investigations. Another concern is that a unique biometric stored in different databases can be used to link these databases and hence support non-approved correlation of data. Finally, there is the concern about searchable biometric databases, wherein covertly obtained biometric data, such as a face image or latent fingerprint, could be used to find additional information.

Before discussing prior art in protecting biometrics, we address the issue of what constitute protection of data. For clarity of discussion we consider protecting a collection of numbers $x_1 \ldots x_n$. Initially, it might seem sufficient to subject the data to a transform that is not mathematically invertible, e.g. $y_i = x_i\hat{\ }2$. While the function is mathematically non-invertible, each point has only a 2-point ambiguity. Anyone that has ever done a cryptogram or puzzle knows that even moderate amounts x of ambiguity is easily overcome with a little bit of knowledge or constraints. For example, if we knew the $x_i$'s were locations in an image and hence positive, there would be no ambiguity. If the $x_i$'s are shifted before squaring, say by "random" but known translation, there would still be no ambiguity. While the transform is formally non-invertible on each datum, knowledge of constraints and/or correlations in sets of data can often be exploited to remove ambiguity and hence effectively invert the overall transform. Thus we can conclude that using a mathematically non-invertible transform is not a sufficient criterion to provide protection.

To see that one can have protection without requiring a mathematical non-invertible transform one only need consider encryption. As anyone skilled in the art will know, without knowledge of the keys, encryption algorithms protect the underlying data from recovery. With public key algorithms, such as the well known RSA algorithm (U.S. Pat. No. 4,405,829), it is practical to have the algorithm and data necessary to protect data be publicly known yet still be able to recover the well protected data at some future date. Thus we can conclude that a mathematically non-invertible transform is neither necessary nor sufficient to provide protection of data.

While public key encryption (hereafter PK), can protect data, it cannot directly solve the problem of biometric data protection. While the encryption can be public, the data would need to be decrypted before it could be matched. A key property of any encryption algorithm is that even a single bit change in the input will cause significant changes in the encrypted data. All biometric data has inherent intra-subject variations across samples. Hence, we cannot just match two encrypted biometric signatures. If the data must be decrypted before each use, it remains vulnerable to capture after decryption. Furthermore, since it will be decrypted for each use the keys must be widely distributed, and because of the computational cost of decrypting each time there will be a strong motivation for the operators to store the gallery in an unencrypted form. Finally the encryption approach provides no protection against insiders either abusing their use of the data or selling it.

What is desired is not a transform that is simply mathematically non-invertible, but rather a transform that is "cryptographically secure", by which we mean the data is protected such that recovering it, either by analysis or brute force guessing, is computationally intractable. A key component of the present invention is how to provide for "cryptographically secure" transforms of biometric data that can be matched while in encoded form and without decryption.

An important piece of prior art is U.S. Pat. No. 6,836,554 B1. "System and method for distorting a biometric for transactions with enhanced security and privacy", Bolle et. al. 2004. This patent follow directly from an earlier paper N. Ratha, J. Connell, R. Bolle, "*Enhancing security and privacy in biometrics-based authentication systems*", IBM Systems Journal, vol. 40 no. 3, 614 (2001). The U.S. Pat. No. 6,836,554, which is incorporated herein by reference, has considerable discussion of other relevant prior art.

In U.S. Pat. No. 6,836,554, the patent claims are focused on repeatable non-invertible distortions applied in the signal domain or feature domain. In the description it is suggested that distortions can be applied in either the image (signal domain) or on feature points (feature domain), during both enrollment and verification. When applied to images rather than features the patent teaches only techniques that are trivially invertible, hence inconsistent with the claims. Also it generally ignores how such transforms can degrade the system's ability to detect the features needed for identification. In addition, such distortions can have a significant negative impact on the measure between the probe and gallery image, thereby degrading the matching accuracy. For feature space transforms, the patent presents only 3 high level examples of non-invertible distortions, with insufficient detail to provide an understanding how to apply them to provide protection. As previously discussed, applying a non-invertible per feature is neither necessary nor sufficient to provide protection. Constraints and/or correlations may result in the majority of the transformed data being recovered (inverted) even when each individual transform is mathematically non-invertible. The U.S. Pat. No. 6,836,554 does not discuss this critical issue nor does it provide an example that provides protection. Furthermore, the patent does not teach us the "comparison process" that is central in its claims, i.e. it does not address the critical issue of how to compute distance measures between transformed features. Those skilled in the art will recognize that many different pesudo-measures can be used for biometric signature comparison, but equally well know that such measures play a critical role in determining algorithm effectiveness. It is unclear what measure would apply after the U.S. Pat. No. 6,836,554 non-invertable distortions. The noninvertible distortions suggested must, by definition, induce ambiguity in matching. Hence, they would significantly degrade the direct application of existing pseudo-distance measures on the biometric data as they increase intra-subject variations. While U.S. Pat. No. 6,836,554 and Ratha. et. al [1] introduces some interesting concept, it does not describe an implementation, provides no accuracy/performance examples and overall fails to teach us how to achieve its claims.

Other related prior art can be found in J. Cambier, U. Cahn von Seelen, R. Glass, R. Moore, I. Scott, M. Braithwaite, and J. Daugman. "*Application-Specific Biometric Templates.*" IEEE Workshop on Automatic Identification Advanced Technologies, Tarrytown, N.Y., Mar. 14-15, 2002, p. 167-171. In that paper the authors suggest an application specific biometric that cannot be matched across applications, but can when authorized be transformed to support changes in the user key or to generate a new key for a different application. Their approach is presented for the case of bit based representation where the "distance" between two transformed biometric signatures is the bit error, or some simple block based bit error rate. Their approach makes many assumptions on the transforms that will be very difficult to implement, but does provide two examples that satisfy their constraints. Important among their constraints is that the pseudo-distance between a probe and gallery must be the same before and after each of them is transformed. Thus their transformations do not degrade matching quality.

The requirement for invertibility of the transforms set forth in Cambier et al. is a weakness that limits the protection provided by the approach. The transform parameters may be stored at the point where the transformation of the biometric signature is applied. By their design, with those parameters and the stored signature the original biometric signature can be recovered. However, this means that if both are compromised, the biometric is compromised. Since the transformation parameters are generally applied at the client side, they will likely be either transmitted or carried on a smart card. Thus the design has traded the need to protect one set of data, the original biometric, for the need to protect the transformation parameters and each of the transform databases.

The transforms needed in U.S. Pat. No. 6,836,554, and Cambier et. al. will likely either be in a central database, accessed before computing the transformed space, or on a smart card. If stored in a central database, either technique could be designed for both identification and verification. Given an unknown sample, such as a latent fingerprint, the systems could obtain all transforms from the centralized database, apply each in turn and if it is "verified" include them as an identification result. This approach, viewing identification as a sequence of verifications of each subject in the database, may not be as fast or quite as effective as a system optimized for identification, but still provides basic identification ability. When used directly, neither approach provides privacy against search. To provide search protection, both techniques mention the use of smart-card storage so that no centralized storage of the transform exists.

Another approach that is implied in various research papers and elsewhere is an encryption of the biometric data to produce a unique key. Such an approach might include a user passcode allowing it to be revocable. However, such an approach has two primary problems. First, if the encryption needs to be inverted to match on the original data, then the system will need the user passcode and convert the data back to original form for matching, hence providing for access to the original biometric data. If the approach does not invert the data, then it must be matching the encrypted form of the biometric. However, the process of encryption may transform input such that adjacent items, i.e. nearly identical biometrics, will be encoded to very different numbers. Given that any biometric has a range of expected variations for the same individual, either the encrypted biometric will often not match the individual, or the data must be degraded so that all variations for an individual map to the same data. However, this would significantly degrade the miss detection rate. Furthermore, the quantization implicitly necessary to ensure no variation in the users data approach would have to fix the FMR/FNMR rate, a decision which would limit use in different applications.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIGS. 9(a), (b), (c), and (d) illustrate fingerprint minutia.

DETAILED DESCRIPTION

Techniques, systems and methods for revocable biometric signatures and identification are described. Broadly stated, embodiments of the present invention utilize a multi-part transforms with robust distance metrics to provide means for revocable biometric signatures and identification.

In the following description, for the purposes of explanation, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Certain elements of the embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, or firmware.

Certain elements of the embodiments of the present invention may be provided as a computer program product which may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs); and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Moreover, certain elements of the embodiments of the present invention may also be downloaded as a computer program product, wherein the program may be transferred from a remote computer to a requesting computer by way of data signals embodied in a carrier wave or other propagation medium via a communication link (e.g., a modem or network connection).

While, for convenience, embodiments of the present invention may be described with reference to physical, workstation, network, and domain access, single sign-on, application logon, data protection, remote access to resources, transaction security or Web security, the present invention is equally applicable to various other current and future applications.

I. Introduction and Overview

Embodiments of the invention provide for a privacy enhanced, secure, revocable biometric based method for identity verification. The invention produces what we call a secure revocable identity Token™, which is a cryptographically secure revocable token derived from a biometric signature. Embodiments of the invention may be applied to a biometric signature that is a collection of multi-bit numeric fields. Generally speaking, the approach transforms the original biometric data into an alternative revocable formsecure revocable identity token that supports a pseudo-distance metric that allows a measure of "certainty" in the match between a probe secure revocable identity token and a gallery secure revocable identity token, without the need for decryption. The computation supports the application of a robust "distance metric" on the secure revocable identity token, which may be provably identical to the application of the same robust metric on the original biometric signature. In various embodiments, the secure revocable identity token will not support the matching of a user's revocable biometric data across different databases.

Various embodiments of the invention support multiple simultaneous versions, and thus different revocable biometrics may be used in different applications, further enhancing privacy and protection if one or more of them is compromised. According to various embodiments, if data is compromised, the user can revoke the stored version and request a new one be used. According to various embodiments, any combination of a user's secure revocable identity token provides no information about the user even though the biometric data from which it is computed is permanent. This is because the stored data does not allow one to recover the original biometric data, and thus this significantly improves privacy while enhancing security. According to various embodiments, the invention supports a stronger form of revocation in which the revocable biometric incorporates a second factor, such as a passcode, in a unique way such that it cannot be used without the second factor. That second factor could not be stored, and hence this form would be revoked if the user simply does not use the passcode. Various embodiments also support only verification and not identification, in that they will not support a "search" through a database. Such embodiments will thus enable fingerprint or DNA based biometric that cannot be used to violate privacy by allowing general searches.

According to various embodiments of the invention, feature space transforms based on the representation of the biometric signature (i.e. after all transforms are computed) are used. The transforms induce a robust distance/similarity metric for use in verification. In a sense, it is an "add-on" after all the other processing, and may be designed not to impact the processing or biometric used. However, effective implementations should consider the existing metric, and inter- and intra-subject variability as part of their normalization. Normalization and alignment issues critical in certain biometrics are addressed further below.

According to various embodiments of the invention, the transforms can be fully invertible, given the proper private key, to obtain the original biometric signature. According to other embodiments of the invention, transforms are non-invertible, trading less risk of compromise for more effort in reenrollment or transformation if the data is compromised. As discussed earlier, invertibility alone is not sufficient for protection, so in both cases it is important that an analysis of the overall security protection of the approach is considered. If invertibility is desired, a PK-based encoding of the transformed data may be used, although many other encoding methods and other strategies may be used in the alternative. If non-invertibility is desired, a non-invertible one-way hash, such as the well known RC4, MD5, SHA1, SHA256, may provide efficient and cryptographically strong non-invertibility as well as detecting data tampering. Simpler non-cryptographic hashes, such as a cyclic redundancy check, can also provide one-way transforms and may be even more efficient Regardless, even if both transformation parameters and transformed data are compromised, the original data would still be unavailable, thus removing the risk of reconstruction if centralized databases are compromised. If an invertible version is used, access to the private key plus the transformation parameters and data would allow inversion. However, the system may be designed so that the private key is not used in the verification process, either for encoding or verification, and therefore it need not be online at all. If the private key is not retained during the enrollment process, the PK-based approach is tantamount to a one-way transform.

According to various embodiments, an integrated multifactor verification is supported wherein the stored data cannot be used for identification or search, even using the "guess each person and verify" approach. Existing multi-factor approaches store the biometric and other factors separately, verify each, and only provide access if all are successful. With this approach, fused data may be stored, and neither the biometric nor the added factors need be directly stored in the databases.

One of the fundamental advances of various embodiments of this invention is a biometric transformation approach that provides a robust distance-based computation for supporting confidence in verification while supporting revocability and verification without identification. Many simultaneous instances may be in use without the ability for anyone to combine that stored data to reconstruct the original biometric.

II. Transformation of Biometric Data and Robust Distance Measures

In order to begin consideration of the invention, some initial assumptions are needed regarding the layout of the data-structures, i.e. field types, widths, and locations, and any coupling expected or used in computing similarity. For the sake of simplicity in understanding, it is initially presumed that all fields are floating-point numbers. Reduced bit representations are addressed after the discussion of the overall process.

In first considering the invention, it is important to note that a robust distance measure is, by definition, not strongly impacted by outliers [5]. In many of the traditional biometric distance measures used to date, such as L2, weighted L2 or Manhalanobis measures, the multi-dimensions penalty for a mismatch grows as a function of distance. Thus, if the data in one sub-dimension is far off, then the penalty is high. In many robust measures, the penalty for an outlier is constant.

Figure 1:
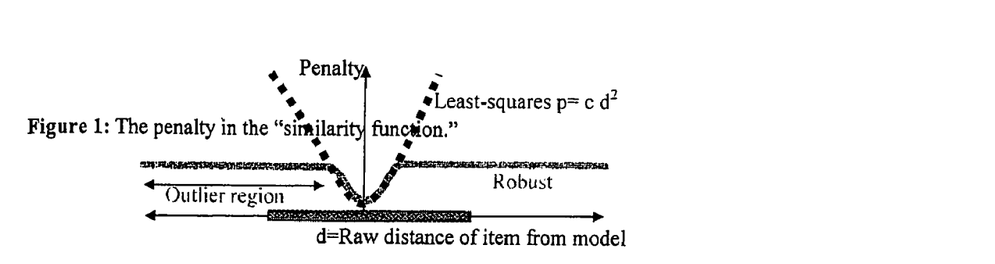
FIG. 1 is a graph that conceptually illustrates the penalty in the "dissimilarity function. Or pseudo-distance function for a single feature value

This premise is illustrated in FIG. 1. For weighted least squares errors, the penalty is a constant times distance, and grows quadratically. Thus a single outlier significantly impacts the fitting. For a robust similarity metric, the penalty is limited to a maximum value so that outliers have a limited impact on the overall measure. Given measurements, p,q, an example robust measure may be defined as $m_b(p,q)=c$ if abs $(r(p)-r(q))>b$, and $m_b(p,q)=(r(p)-r(q))^2$ otherwise. Those skilled in the art will realize that many alternative robust measures could be used.

Note that in some fingerprint systems, a "distance" measure is used to decide if a pair of minutia match, but the overall score is made robust by not summing the distances for each match, but by thresholding each match distance and then counting the number of matches below threshold. Such an approach is robust if a large number of matches is required, but can also be sensitive to a change in the threshold. An alternative is to set a maximum penalty for each mismatch but still consider distances, and thereby a small change in threshold will not cause a radical change in match score.

Before they are discussed formally, various embodiments of the invention will be addressed conceptually in a mixture of graphics and text for a simple biometric signature with 1 field. It is assumed for simplicity of explanation that the "distance" measure is simply the distance from the probe to the enrolled data, and that the "verification" is then based on a mixture of the absolute distance. It is assumed that the metric produces a value v which is then transformed via scaling and translation, $v'=(v-t)*s$. According to various embodiments, the transformation is not limited to scaling and translation, as rotation, transcendentals, or other means may be utilized as well to accomplish a similar purpose. The resulting data is aliased back, and without loss of generality, this can be represented with residual r=the fractional part of v', and general wrapping number g=the integer part of v'. Such embodiments of the invention will then provide a one-way transform of g to hide the user's identity. The shaded region on the axis of FIG. 1 shows an example "residual region" after an appropriate transform. This illustrates important concepts of different embodiments of the invention. A mapping hides the actual value, but as it separates the result it leaves an unencrypted value within the "window" in which local distance can be computed, and then encrypts the larger (and hence very stable) part of the position information, thus effectively hiding the original positional data.

In this Specification, the values r, w, s, t and other representations are used throughout to illustrate certain principles. However, their use is not meant to limit the applicability of these principles. Instead, where applicable, they should be considered broadly. For example, s and t are used at times to signify the data transformation process generally in a wider discussion. As such, the concepts of the wider discussion should be applied to the data transformation process generally, and not limited to scaling and translation. The specification is written to make it clear and provide a workable example, where r, w, s, t and other representations should be considered narrowly, but broad applicability should be assumed otherwise.

Figure 2:
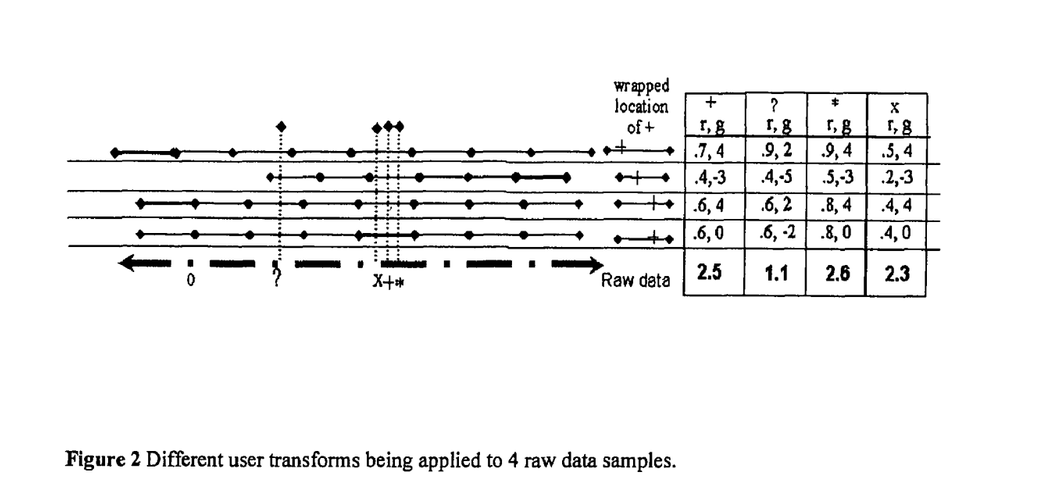
FIG. 2 illustrates different user transforms being applied to 4 raw data samples.

Four different transforms, and their effects on 4 data points are shown in FIG. 2. The raw positions are shown on the axis on the bottom of FIG. 2. The first transform, the top line, has a larger "cell" size, which equates to a smaller scaling (s) before aliasing. The second example has a larger scaling, and thus a smaller "cell" size". The remaining two examples have the same scaling (s) but different translations (t). The table on the right shows the resulting numerical representation of the 4 symbols. Note how, for the last two transforms, the ? symbol wraps directly on top of the + (i.e., their r values are equal) with only the generalized wrapping number, g, being different. In the first transform the ? aliases on top of the *.

Figure 3:
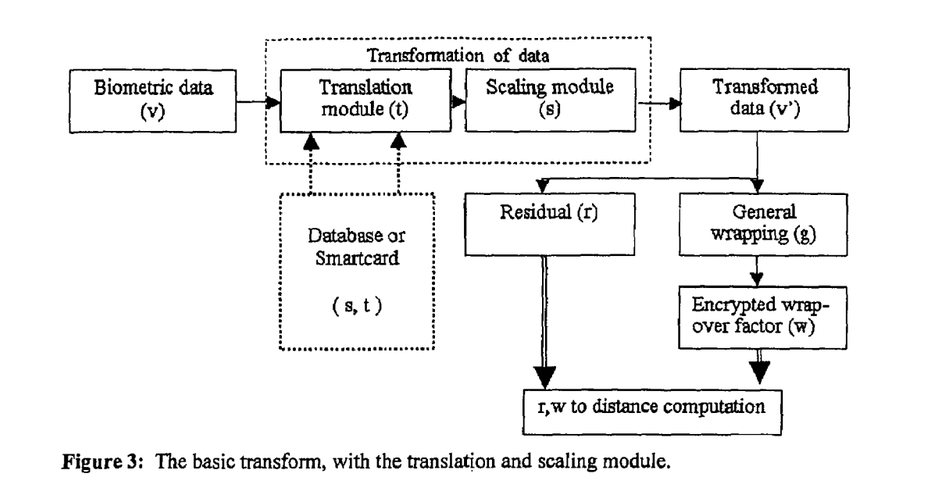
FIG. 3 conceptually illustrates the basic secure revocable biometric transform concept, given the translation and scaling module, according to various embodiments of the invention.

The transformation of the biometric data according to certain embodiments of the invention is summarized in a number of flow charts. FIG. 3 illustrates the basic transform according to various embodiments of the invention, given the translation and scaling module values (selection of s, t is discussed in the section on enrollment). According to different embodiments, the transform parameters (s,t in FIG. 3) may be stored in the central database (with r,w used for identification), may be stored locally on a smart-card, or may be stored using other means to accomplish a similar purpose.

Figure 4:
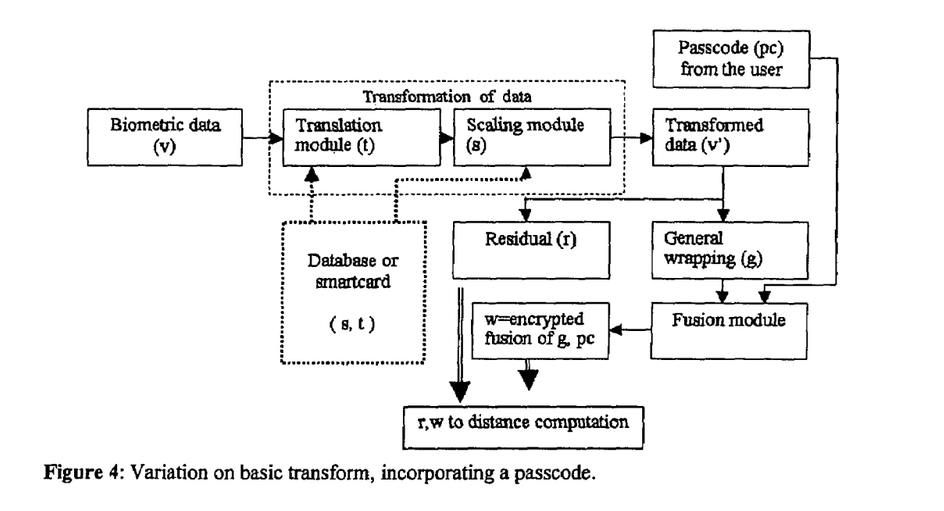
FIG. 4 conceptually illustrates the basic biometric transform concept, incorporating a passcode, according to various embodiments of the invention.

FIG. 4 illustrates the transform process according to various embodiments when a passcode is combined. The transform and wrapping are computed, and then the passcode is fused with the generalized wrapping index, g, before it is encoded. Fusion modules may include concatenation, XOR, or even addition.

While the discussion above and FIGS. 3 and 4 illustrate transforms using scaling and translation, and kept the integer and fractional part, this is just an example of the potential embodiments. As noted above, a variety of other transform techniques may be employed. When finite bit fields are addressed, modulus will be used with the quotient and remainder. It is sufficient if the transform breaks the data into at least two parts, including at least one field, r, that after mapping contains the expected region of the biometric intra-subject variations and hence supports distance computations, and at least one field, g, which can be secured and will therefore need to be exactly matched. Matching the combination of fields provides for the robust similarity measure, and the secured encoding of g protects the identity. Those skilled in the art will quickly see other potential mappings that satisfy these constraints, including periodic functions such as sine and cosine. Some mappings may improve support for other "robust" metrics, such as Tukey-biweight or cosine-weightings (rather than weighting by squared distance). The scaling/translation used have the advantage of maintaining the local distance measure as will be discussed next.

III. Robust Distance Computation

In a robust distance computation, outliers do not significantly impact the distance measure. A simple form of a robust distance computation has a constant penalty outside a region around the data, as was shown in FIG. 1. This simple form computes distance only within the local window. Various embodiments of the invention include a robust distance measure of this general scope, and such a measure adapts easily. Various embodiments of the invention include more complex distance measures as well. An example is addressed below, and should enable one skilled in the art to adapt a very wide variety of such complex distance measures in the various embodiments.

Figure 5:
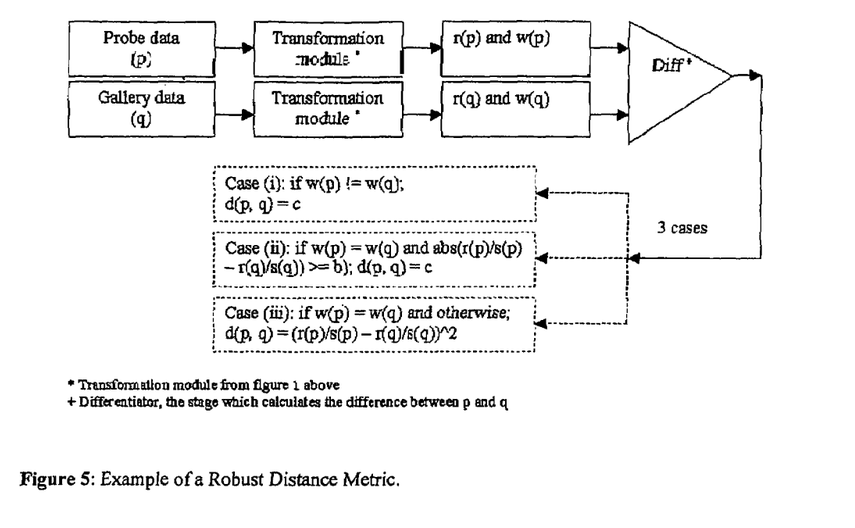
FIG. 5 illustrates a robust distance metric, according to various embodiments of the invention.

According to the following embodiment, g represents the overall location of the robust window, while the residual r provides the region in which the robust measure can be computed. w is an encrypted or one-way transformed version of g. We call the combination r,w the encoded formsecure revocable identity token of the feature, and transform each feature separately. Then, for signatures p,q, transformed using s,t yielding $r(p), r(q)$, $w(p), w(q)$, this embodiment defines a robust pseudo-distance metric $d(p,q)$ as follows:

$d(p,q) = c$ if $w(p) != w(q)$
$d(p,q) = c$ if $w(p) == w(q)$ and $abs(r(p)-r(q)) >= b$
$d(p,q) = (r(p)-r(q))^2$ otherwise The results of the transformation is a pair of encoded values, r,w, which as described above can be used for computing the distance. The distance computation according to this embodiment is summarized in FIG. 5. This distance computation is just one example of a robust distance measure, one that uses a constant penalty outside a fixed window, and least-squares penalty within the window. The unique properties of the mapping ensure that the window around the correct data is mapped to a window in which the robust distance measure can be computed. Given the window, it should be evident to one skilled in the art how a variety of alternative robust distance measures could be applied with reasonable adaptation.

IV. Enrollment

In light of the foregoing discussion, it should be clear that given r,s,t and g the original data can be reconstructed. It should also be evident that many distinct datapoints will all have the same value for r, and that without knowledge of g, the original cannot be recovered. Actual security of the transform will be discussed after discussing the process of enrollment. According to various embodiments of the invention, the biometric "store" would maintain the transform and the secure revocable identity token computed during enrollment. For clarity of discussion, the values r, s, t and w will be used to represent the secure revocable identity token in the discussion below.

Each of these (r, s, t, and w) can be considered user specific functions that can be applied to an input signature, e.g., $r_k(v)$ is the residual associated with biometric signature v when using user kth transform, and $w_k(v)$ is encoded value w that results from v after applying the transform and the encryption/one-way mapping associated with user k. With regard to the enrollment process, an important issue is the choice of the transform parameters, in this case scale and translation. According to various embodiments of the invention, if $e_k$ are the enrollment biometric signatures for user k, then if $s_k$ and $t_k$ are chosen such that $$bs_k < r_k(e_k) < (1-bs_k) \forall j \qquad (Eq\ 1)$$

then is easily follows that $d(p, e_k) = m_{sb}(p, e_k)$. Thus, the robust dissimilarity measure applied to the transformed data is the same as the original robust metric applied to the raw data with a robust window of size (s*b). Since s and t may be chosen separately for each feature of each user, and this may be done after $e_k$ is known, it is straightforward to satisfy the above equation and hence maintain the robust dissimilarity measure. Even with the constraints, there are still "infinitely" many choices for t for "real" numbers, and a huge range for floating points. For finite bit representations, there is more of a constraint, which is discussed later, but for some values of b it can be satisfied for any field with more than a single bit. This is a key property of the invention, preserving the robust distance measure after transform. For effective usage the range of values used to determine the scale in Equation 1 should as large as the maximum variations of that parameter for that user. In practice the enrollment data may not provide a sufficient range of variations, and for our testing we have increased the enrollment range by a factor of 3 to ensure that the actual user's data does not fall outside the scaled window and thus ensure that $w(p) = w(q)$ if p and q are from the same individual. Note, however, that while the distance measure is preserved for the enrolled user, it is not necessarily preserved for an imposter, for whom the enrollment criterion is not in general satisfied. For non-matching users encoded with user k's transform, Equation 1 will not necessarily be satisfied and scaling/shifting may result in the per field distance being equal to c, even if the field was initially close enough that the pre-encoded distance was <c. If c is chosen such that it is greater or equal to the maximum distance within the robust window, then for non-matching, the users transform may increase, but cannot decrease, the distance. By maintaining the intra-subject distances and producing potentially larger inter-subject, the overall accuracy of the matching will be at worst the same and potentially improved.

This enrollment process detailed above seeks to choose s and t so that the example linear transform used for hiding the identity will produce a robust distance measure computed on the transformed data, as described in the previous section, which exactly matches the original robust distance metric in the original data space. Importantly, note the inverse scaling by s in the distance computation in the previous section. According to various embodiments of the invention, an application may seek a different type of transform or a different robust distance criterion. In such cases, the enrollment criterion would use the selection of the parameters of the transform or distance measure to ensure the pre- and post-transformed distances are the same. One skilled in the art could define similar enrollment criteria preserving the robust distance.

Figure 6:
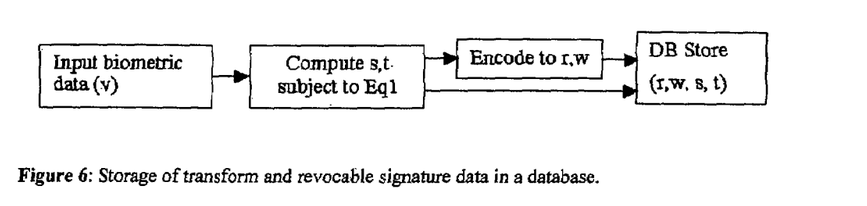
FIG. 6 conceptually illustrates storage of the transform and revocable signature data in a database, according to various embodiments of the invention.

V. Storage of Transform and Secure Revocable Identity Tokensecure Revocable Token Another issue is that of storage of the resulting transforms secure revocable identity tokensecure revocable identity token. According to various embodiments, the values associated with the transforms (such as s, t) and revocable signature data (such as r, w) are stored in a central database, as illustrated in FIG. 6. To revoke the resulting signature, the user may contact the database administrator or otherwise request that the current entry be removed or replaced with a new signature. The user must trust that the central database is updated.

Figure 7:
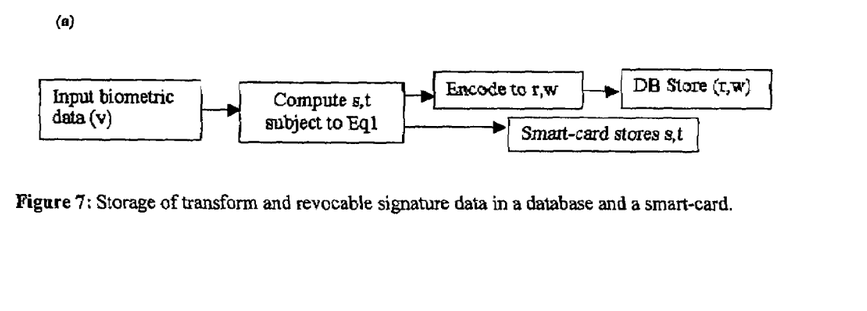
FIG. 7 conceptually illustrates storage of the transform and revocable signature data in a database and smart-card, according to various embodiments of the invention.

According to various embodiments, the transform parameters are stored in a smart-card, as illustrated in FIG. 7. The term smart-card includes any portable device or other user-controlled media which has the capability to relate information to a particular application. Revocation may require an update to the smart-card, and reenrollment in a central database if the user wishes to change the signature. This makes it strongly revocable; as the user does not need to trust the central authority to delete the old entry. In addition, verification is supported, but not identification because the central database is not searchable without the transform parameters stored only in the smart-card.

Figure 8:
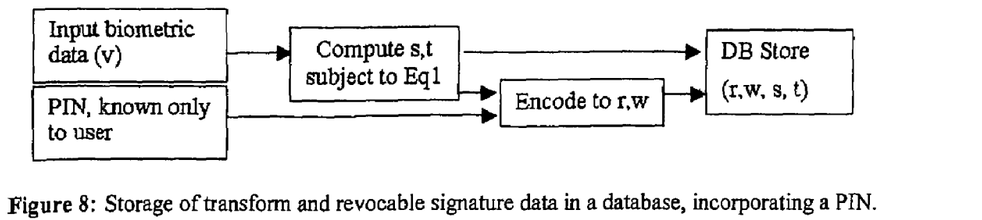
FIG. 8 conceptually illustrates storage of the transform and revocable signature data in a database, further incorporating a PIN, according to various embodiments of the invention.

According to various embodiments, a user passcode or pin is fused with the biometric data to produce a robust and strongly revocable biometric. This concept is illustrated in FIG. 8. Since the user passcode is never stored, it is not impacted by any compromise of the datastore. It is strongly revocable since the user can simply not provide it, and the old data will not match. If the passcode space is sufficiently large it can effectively prevent using the resulting secure revocable identity token for identification or search.

VI. Multi-Dimensional Data

For a biometric with N dimensions, each dimension may be treated separately. For ease of discussion, R, W, S, and T will be used to represent the transforms and revocable signature data. This discussion however should be viewed broadly, allowing one skilled in the art to apply like principles to alternative transforms and revocable signature data for multi-dimensional data to gain similar results. According to various embodiments of the invention, given a raw biometric vector V with n elements, V'=(V−T)*Diag(S) is computed, where each of T and S are now vectors of size n and Diag(S) is an n by n diagonal matrix generated from S. This results in residual vector R, and general wrapping G. Again G is transformed to the encrypted W, and the biometric store retains T, S, R and W. If the system designer uses a Mahalanobois measure, the covariance transform may be applied to V before its translation and scaling. This simplifies the process since after the covariance transform the data is mean-zero and scaled so that the variance in each direction is equal. With such a transform it may be possible to choose a single scale parameter S, rather than a vector of scales reducing the extra storage requirements. The distance D(P,Q) is then the component sum of d(p,q) for each dimension. If the biometric has control or validity fields, which say when particular fields are to be ignored, they may be incorporated into the computation of D.

For local verification, the client process may request the particular T, S, R and W and the encryption key PK (which may be digitally signed to avoid man-in-the middle attacks). It then may compute the transformation and the robust distance D, thresholding to verify the user. For a central verification, the client process may request, or may have stored in a smart-card, T, S, and PK, compute the transformed data R and W, and send the data (digitally signed) to the central site for the distance computation and verification.

According to various embodiments, the reported data may also include liveness measures or added fields that are modified versions of a digital signature sent from the central authority to insure that the data is not a replay of old biometric data. Also note that any reference to T, S, R and W also includes t, s, r, and w, except where such an interpretation is plainly inconsistent with the discussion (i.e. where the discussion is clearly directed only at multi-dimensional data).

VII. Encoding (Encryption/Hashing) of W

According to various embodiments, to ensure that the biometric data is protected even if the "transformation" data is compromised, the mapping from G to W is non-invertible or otherwise cryptographically secure. This can be accomplished with a one way hash, such as MD5 or SHA. In this case, G cannot be recovered with the data stored in either the transformation database or the biometric database. The disadvantage of this approach is that if a user wants to "revoke" their revocable biometric, then another biometric sample is necessary to regenerate the necessary data for a new revocable signature.

To support user requested transformation as part of revocation, public encryption of G to produce W may be considered. According to such embodiments, the user could receive the database entries, compute the original vector using their private key (which only they have), and then recompute the new transformed data. This may be done without the need for a reacquisition of biometric data, and hence without access to a sensor. For a commercial application this has can have significant advantages in reducing operating costs and customer convenience.

In one embodiment, the enrollment data is used to produce a master secure revocable identity tokenidentity token, using either form of encoding. The fields in the master secure revocable identity token are then re-encoded with a second company specific key to produce an operational secure revocable identity token. The company can then take the master secure revocable identity token offline (for added security) and work only with the operational secure revocable identity tokens. If there is a potential compromise of the database the company can then reissue a new operational secure revocable identity token. For this second encoding PK encryption does not offer a significant advantage, as the company would have to protect its private key, or protect the master secure revocable identity token, which requires similar efforts. Since PK encryption is more expensive than hashing, it may be used only for generating the master secure revocable identity token, while hashing is used for the operational one.

VIII. Generating a Non-Identifiable, Secure Revocable Identity Token for Verification According to various embodiments, a biometric signature is generated that is suitable for verification but which cannot be used for identification, even with the approach of guessing each individual and then trying to verify the individual. To accomplish this, a second factor is added, such as a pin or password which is combined with the biometric signature. Exactly what factor is used not critical, as long as it is exactly reproducible. This factor will be referred to as a "passcode." Often, in a multi-factor system, each of the factors is tested independently, and the storage of each must be protected to ensure system security. In embodiments of the proposed invention, however, the passcode and a recoverable biometric may be combined into a single fused factor. For the proposed representation, it is sufficient to consider G+passcode, or other simple mixing of G and the passcode data. After encoding the combined data to form W, both the original secondary factor and the value of G cannot be recovered from the encoded form. The passcode and G are typically not stored. However, depending on the level of security desired, different storage strategies may be employed.

The result is a biometric signature that cannot be used for "searching," even by repeated guessing of possible identities. For example, if a latent fingerprint is found, there would be no way to use it to compare to a fingerprint that has been encoded using this approach. If the identity is guessed and transform applied, the encoded index W could not be verified. As a result, if a table of the passcodes is not maintained online, this representation can be used for verification but not identification. The added privacy of this approach depends on a sufficiently large space of passcodes, as the approach can be attacked by simultaneously guessing an identity and its passcode. If the passcode was a 4 digit pin it increases the cost of searching by 10000, and a 8 digit pin would increase the costs by $10^8$. If was a 6 character alpha-numeric password, the hardening is sufficient to render it effectively unsearchable.

In this revocable, multi-factor secure revocable identity token, mixing two factors (something that you know, and something that you are) makes revocation simple. All that is needed is to request a new biometric and provide a new passcode. Furthermore, the revoked biometric is now "strongly revoked" in the sense that the user knows that they are no longer using the old passcode and that without that passcode the raw biometric data cannot be used for access to the old data. The disadvantage is that, if the user looses the passcode, they must reenroll as there is no passcode reset or way to lookup their passcode.

IX. Finite Bit Representations

According to various embodiments, finite bit representations are provided for. In other embodiments, real numbers or at least floating point representations of fields were presumed. However, in some biometric representations it can be expected that finite bit representations such as 16 or 8 bit integers will be used for at least field in the overall biometric signature. There are two basic issues that may be modified to handle such integer representation. First, although there is no integer and fractional parts, modulus operations may be employed and the quotient can be used for the general wrapping number g and remainder for r.

A second and more fundamental problem is that small bit representations limit distance computations, and thus limit the transforms that can be used. The results may not provide as robust a distance measure, while simultaneously the ability to hide the user's identity may be reduced as well. One way to address the problem is to extend the representation for processing. For example, the original 8 bit value may be embedded in a 16 bit number. The transform may be done in that larger space, while a modulus or similar operation may be done with something the size of the original data, thus keeping the quotient and remainder.

One issue that may remain is that the window for robust distance calculation ("b" in the calculation) needs to be smaller than the modulus operation. Thus, if each field has an 8 bit representation, 6 bits may be used for "distance." However, if the original space required all 8 bits for effective distance calculation, then the representation to may need to be expanded to approximately 10 bits for the remainder, and approximately 14 bits for the quotient. Note that the size of the quotient is not as critically tied to the original size, since it is also dependent on the scale. Furthermore, in a larger dimensional representation, the exponential multi-dimensional nature of the quotient may be gained to add in identity hiding. Thus, even if the quotient had only 6 bits, in a K dimensional representation there would $6^K$ different possible values which for K>6 is reasonably good identity protection, and K>12 is excellent. An attack may not have access to the raw quotient, as that space may be important only to address brute force guessing. Furthermore, even with limited bits, if the encryption of G to W is a sufficiently large field (64 bits or more), and is combined with a passcode part, then the identity is well protected.

An additional "finite bit" issue is for biometrics that use a large number of single bit fields, which is atypical (but see [3]). In this case, the distance for a field is either 0 or 1, and for an overall sequence of bits the Hamming distance is used to determine the number of differing bits. In this case the robust least-squares distance measure may have little meaning, and may have no effective "b" as described above for defining scale. While the concept of transformation followed by modulus still applies, the binary nature and the requirement of maintaining the distance measure strongly reduce the ability to protect the data from inversion. The prevention of inversion may be better than that of either the permutation or XOR approach suggested in [3]. However, pragmatically, pure bit-based data may necessitate the use of either a passcode, or storage of the transform on user-controlled media to protect it from inversion.

An final, and very significant, "finite bit" issue has to do with ensuring it computational difficulty to recover the field. Even if the forward transform is cryptographically secure, if the field to be encoded is small enough, a brute force attack to generate the "inversion" table is straight forward. E.g. if the field x was a 10 bit integer, common for "minutiae locations" in a fingerprint image, even with a 128 bit RSA encryption, one could quickly generate the results of encrypting the entire 1024 entries that could result from encrypting such fields. Thus direct use of encryption on small individual fields does not provide adequate protection. One solution to improve this is to prepend or append data to the short field before encoding. If the pad was random, it provides significant protection. However, since we need to be able to match the encoded form computed at the time of verification/identification with that computed during enrollment, we cannot use random pads. Using a "secret" but repeatable pad, e.g. a company specific key, can improve the security against outsider attacks, but does not improve the difficulty for someone with access to that key.

But in general, we don't have just a single field that requires encoding. If there are multiple fields the fields to be encoded might be concatenated, but this means that an error in any field will keep multiple fields from matching. This may be acceptable in some setting but would, in general, decrease the overall system accuracy. An approach to making a computationally intractable encoding for small fields, it to "project" them down to an even lower dimensional field, thereby introducing ambiguity, e.g. converting a 16 bit integer into an 8 bit integer will result in each field having, on average, a 256 point ambiguity. If the size of the field, after projection, is small it will, also increase the change of a random match which may also reduce the distance to an imposter, thereby decreasing system accuracy. If a single biometric entry has multiple features that are required to match, as fingerprint minutiae, the chance of a random projection can be decreased by applying the projection to all fields separately, but then randomizing or otherwise removing the order of the fields. Then when matching, all possible pairings (with repetition) will need to be considered. For example, if there were three fields to be encoded, one would need to try all 6 possible pairings of the encoded probe fields compared to the encoded gallery fields. While the multiple orderings also increase the chance of a random match, the requirement that all fields match simultaneously greatly decreases the overall chance of a random match. Note that if the number of available fields, say n, is not sufficient for this hardening approach to provide sufficient protection, extra data fields may be generated, say m, at random or functionally related to the existing fields, with the requirement that the probe's n fields must find n matching fields in the gallery's n+m fields. An example and analysis of using this projection plus multiple field matching approach is discussed in section XI. Examples Of Application To Different Features X. Standards for Representation There is a significant trend toward the standardization of biometric data, including the INCITS M1 Technical committee, the BIO-API (ANSI/INCITS 358-2002), and ANSI/NIST-ITL 1-2000, and the CBEF (Common Biometric Exchange Format). Many of these are simply standards for passing image and sensor data, but a few of them, including BIO-API, are for transmitting processed features.

While BIO-API provides for the transmission of feature data, the data is in the "opaque biometric data" field and the packet does not include the format of that data. Various embodiments of the invention may be applied, and it not required that the "interpretation" of the fields be provided. However, their format, numeric range and expected variance (for normalization) may be required.

It would be relatively straightforward to extend BIO-API to support the various embodiments of the transform, encoding and enrollment processes described herein. This may require either providing for a mapping of the "opaque biometric data" in a vendor specific manner, or extending the BIO-API to include a data description of the opaque field.

XI. Examples of Application to Different Features

According to various embodiments of the invention, different features are used to provide biometric data. The features to be measured should be distinctive between people and have a sufficient level of invariance over the lifetime of the person. The embodiments described below are merely representative of the techniques to be applied, and in no way limit the features to which the invention may be applied.

a. General Discussion—Fingerprint or Palmprint: Fingerprint systems represent one of the largest biometric segments. There is also a strong need for protection with a secure, robust, and recoverable biometric, since they are not generally visible data, can be duplicated or faked given an image, can survive as latent prints for weeks or months, and are often associated with police investigations. They are also easily scanned, and fingerprint information is quickly proliferating.

Processed features from fingerprints generally fall into three main categories: minutiae, minutiae groups (triangles), and textures. Many other systems "transmit" the full image or a global representation of the image composed of blocks where each block is represented via parameters of sine waves that represent the ridges in that block. Systems that use the full image or image alignment and matching may not be well suited to conversion to a robust, revocable formulation, because their matching algorithms require the image. If the "verification" engine can reconstruct the full fingerprint image, then the biometric is not "revocable." Therefore, feature-based representations are more readily adapted and applicable to various embodiments of the invention.

Figure 9:
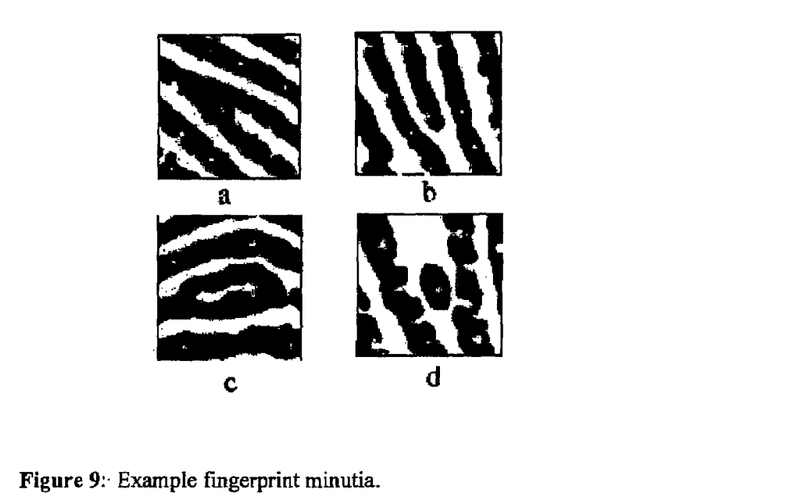

Example minutiae are illustrated in FIG. 9, with examples of (a) bifurcation, (b) ridge ending, (c) eyes, and (d) islands or line-units. While minutiae usually refer to these four groups, a larger scale of critical points (core and deltas) is also included in this class of representations for purposes of discussion. While there are many representations of minutia, a common one is the type, position and local angle. Position may be represented in x,y (image coordinates), or more commonly in a localized coordinate system (radius and angle from as measured from fingerprint centroid). A critical issue for a pure minutiae matching based system is the alignment of the probe and template minutiae. Thus, the coordinate systems must be made consistent. These alignments are typically computed from singular points of the fingerprint, such as core and delta locations, or from clustering of minutiae.

Some systems use a rotation and translation estimation method based on the properties of ridge segments associated with ridge ending minutiae, and various embodiments of the invention may make use of such a system. Note that such alignment techniques do not match features, and can be computed given only the image (either probe or reference template). With such an alignment, it is possible to define the reference coordinate system and then compute the features. The secure form may leave the "reference" points in their uuencoded state, if the system needs to verify the matches of the reference points. In general, however, for maximum privacy even these points should be encoded. By way of example, for each minutia, a system may have 2 positional coordinates (8 bit integers), a type (4 bits), and an orientation (8 bits). Since the type fields should be made to match exactly, they may be included as part of the index G for the feature. Scaling and translation, or other specified transformation, may be applied to all three 8 bit fields, then be processed with the modulus operator to produce their respective residuals and quotients. The concatenation of the quotients and the 4 bit type may then be encoded, be defined as G, and then encrypted to W.

Another representation common for fingerprints is to convert the minutiae into a representation that is translation and rotation independent. One such matcher is known as the Bozorth3 matcher and with source include in the NSIF2 suite of tools from the National Institute of Standards and Technology. The natural form of the matcher takes as input a minimal minutiae file with x,y,θ,q, where x,y is the location, θ the angle and q the quality. The system converts this to a "pair table", which stores: the distance between the pair, and the angles of each minutia with respect to the line connecting them and the overall orientation of the line connecting them. We apply our transforms to the table rather than the original minutia, which means we did not need to change the matcher except to add the test of the encoded fields matching exactly, and added normalization to the scoring. In particular we transform the distance field and the two minutia angle fields $(\beta_i, \beta_j)$ but left the type and inter-minutiae angle $(\beta_k)$ uuencoded because of how they were used in the matcher. We could have used the same transform for all of a subjects rows, but because these were small field, we employed many different transforms (32 in these results), with the distance field and user ID determining which transforms to use. One embodiment, with results presented in Table 1, uses a is a mixed approach allowing both PKI invertability and multiple encoding for added security. For a given "row" in the Bozorth matcher, there are 3 primary 16 bit integer fields that we need to encode. To protect these fields we transform and save the residual as before but then take the data to be secured and process it two ways. First, to support full PK inversion we want an PK invertible version of the data. To do this we build a column of data using the AES encrypted compressed form of the data, padding as necessary to producing one full "column" of data. This column's worth of data is called is called the PK-invertibility data. We then PK encrypt the AES key, a random index and SHA1 hash of the compressed minutiae data. Since the data is treated as a block, rather than individual short fields, this encryption properly protects it. Note this encryption needs only to be done during enrollment (when we desire a fully invertible template. For matching we can use random data in its place or simply ignore it all together. The second step of encoding is to take the data to be encoded and compute a short cryptographic hash or cyclic redundancy check (CRC) of the data concatenated with a company specific key. The hash projects the data such that in a brute force attach many inputs, say p, will all produce the same encoded result as the correct data, providing for a need to resolve the p-fold ambiguity. Here we are exploiting the collisions to provide an ambiguity and the hash to make the resulting field sensitive to all bits in the "integer to be encoded". We can further increase the ambiguity by having multiple columns in the encoded data, one for the hashed-result of distance fields, the hashed-results of the angles, the PK-invertibility data and, if desired, chaff columns of random data. In the "enrollment template", we randomize the columns (separately for each row) so there is no apparent ordering. The randomization is done using the random-index is included in the PK encrypted block so that we can recover the "random position" of the encrypted data stored within each row. We store the PK-invertibility data in positions defined by a mix of the company key and the individual id. When matching, this means we must consider a match of any field against any field (without replacement). A true feature, when compared, will find a consistent set of encoded result. If there is a consistent matching of the encoded fields, the remainders are then used to determine if there is an actual match for the row. Because the matcher looks for a maximal size web of rows where the overall rotations (computed from the inter-minutiae angle $(\beta_k)$, which we don't encode) are consistent, the chance of a random/imposter row impacting the matching score by matching all three encoded fields, even given the potential ordering, is still small enough to not significantly impact the overall matching performance. That is, if there is a random matching row, caused by accidental matching of the now unordered fields, it is very unlikely to produce a consistent rotation with other fields. In terms of the overall security of this PK-invertible approach, the particular example here has 3 independent 16 bit fields, which are hashed down to 11, and uses 4 columns. (Hashing down to 8 bits would improve the security but increases random row matches which, while it does not significantly impact accuracy, does slow the algorithm down.) Brute force search space for the fields has $2^{48}$ elements, though resolution in angles makes the effective space closer to $2^{36}$ The hashing and multiple columns produce an overall $2^8$-fold ambiguity, per row, a would-be attacker must resolve. Depending on the desired accuracy and storage requirement, a true match will require between 16 and 256 matching rows. Since the per-row ambiguities multiply as one tries to build a consistent web, the overall approach provides ample overall security, requiring searching at least $2^{128}$ items for a brute force attack against someone with full knowledge of the algorithm and with access to the company keys, and requiring searching $2^{196}$ for those without access to the company keys. Performance of a Bozorth-based secure revocable identity token algorithm on standard fingerprint databases is show in Table 1. These tests are against the Fingerprint Verification Challenge datasets, well know to those skilled in the art. As in each verification challenge, the test has 2800 true matches and 4950 false match attempts. The verification challenges did not consider recognition, but demonstrating that secure revocable identity tokens can also be used for identification/recognition, we present the "pessimistic" rank-1 recognition rate, which is computed over 640,000 comparisons using the "worst" possible probe and gallery set pairings. For verification the table shows both the improvements in the Equal Error Rate (ERR) for Secure revocable identity token compared to NSIF2 Bozorth3 matcher using the same inputs from mindctd component of that package. It also shows the actual equal error rate achieved. The average computation time for a match was <0.5 seconds including encoding and matching. We note that including more features during matching (e.g. ridge counts) can improve performance but were not tested here as they are not used by Bozorth3.

TABLE 1

Finger Secure revocable identity token Performance

| Measure Dataset | Verification EER Improvement | Pessimistic Recognition Improvement |
|---|---|---|
| FVC '00 db1 | 30% to .029 | 0.0% to .93 |
| FVC' 00 db2 | 37% to .025 | 0.0% to .95 |
| FVC' 02 db1 | 34% to .012 | 0.0% to .95 |
| FVC' 02 db2 | 30% to .031 | 0.0% to .93 |
| FVC '04 db1 | 39% to .086 | 3.0% to .80 |
| FVC '04 db2 | 33% to .075 | 2.3% to .83 |

Another representation that does not need a global reference coordinate system, but uses triangles formed from minutiae [6]. This system has the advantage that it can be applied more readily to partial-prints where the key features for alignment may not be present and had added local structure compared to the Bozorth-style matcher. In this representation a triple of minutiae are selected and used, with the relative angles, handedness, type, direction, and length of maximum size. Various embodiments of the invention are easily applied to these fields per triangle. The handedness and type fields may need to match exactly, and thus may be incorporated directly into G, with the other fields needing to have a similarity score for matching potential triangles. The overall similarity score would then be summed over potential triangle matches.

For fingerprint systems using texture, such features generally represent the magnitude of various texture operators, such as Gabor filters, at various locations. Texture features may also be used in palmprints [7]. Various embodiments may encode the locations and coefficients of these texture operators.

b. Hierarchical Print Matching: An issue for some fingerprint systems is that the alignment would not be sufficient to allow unique pairing, and thus some level of search for potential matching is needed. Furthermore, such systems may not support a "per field" selection of transformations. Various embodiments of the invention therefore incorporate a multi-layer application of the key ideas. A discussion of such embodiments follows.

Such a system may utilize global parameters or critical features for an initial alignment. However, rather than a single secure part, g, and a single match with a single w, r pair, the encoding may be broken into a hierarchical set. By way of example, transform, $s_1$, $t_1$ is applied and a resulting $g_1$ is computed and encoded to $w_1$. The matching-resolution or size of the "residual" would be quite large, allowing a general matching. The resulting $w_1$ may then be matched against the initial set from the database producing a subset of potential matches. These matches can then refine the coordinate transforms (scale/translation/rotation) that in turn determine which transforms are applied to which data. Given that subset, a secondary transform $s_2$, $t_2$ may be produced and used to generate a secondary level $g_2$. This process may then be iterated to produce the final $r_n$, $g_n$ and $w_n$.

This sequence of transforms may allow initial matches that are much less precise in location, eventually refining the alignment. There is a trade off between the number of levels and the amount of information revealed about the underlying biometric, with more levels revealing more information. For example, if each level revealed the next "bit" in the representation, then using 8 levels could provide sufficient information to reconstruct an original 8 bit quantity.

This multi-layer approach also increases the potential space of transforms for those applications requiring search. If no matching of features is possible, then there cannot be a per-feature assignment of transforms. If a single transform is used for all data, the requirements of maintaining the robust-distance metric may limit the number of effective transforms available. By allowing different transforms, but still supporting limited searching and alignment that issue is addressed. For example, a fingerprint image might be divided into 4 quadrants, with a different transform for each quadrant (with some level of overlap).

The above is just an example of the types of tradeoffs that exist to support some level of search while still supporting the privacy enhancing nature of the invention. In another variation, which can address uncertainty in alignment and matching, multiple different g/w pairs could be produced for a particular feature. Another variation would include generating "alignment" features, which are not actual biometric features but combinations of raw biometric features (e.g. averages of feature location/orientations that satisfy some property). These alignment features would be presented in an unencoded form to support the alignment process. Since they provide little to no information about the actual biometric data they do not compromise the privacy of the data. Once the datasets are aligned the earlier described approaches can be directly applied. These are but examples, those skilled in the art will be able to directly define many variations of the hierarchal and other alignment techniques that support the inventions use in their particular domain.

c. Face-based. Various embodiments of the invention utilize face-based systems. Current academic and commercial face-based recognition systems typically compute a relatively small "template" from the source image, which contains the features used for matching. Some have open definitions, while others have multiple byte fields that are not documented, and are embedded in a larger structure that includes basic header information. The layout of the template may thus need to be modified, and this would impact the matching code.

As an example, Identix's FaceIT system supports two different templates: 1) the vector template, currently 228 bytes, used to perform a rapid search for candidates, and 2) the full or intensive template, 7.8 Kilobytes in size, used to perform the intensive analysis on the top N % (typically 5%) of order matches from vector searches. The full template is often used in verification operations. While neither template can be used to recover the original face image, the templates are still a direct representation of the biometric and cannot be changed.

A PCA-based face recognition system is worth considering in more depth. In this case, the features in the biometric signature are floating point numbers that represent coefficients of the original image, properly normalized, with a set of PCA-basis vectors. The signature size can vary, often using 60-150 coefficients. Note that for this representation, given the basis vectors and the signature, an approximate image of the subject may be recovered. The need for security for this class of algorithms is thus of greater concern. As a collection of 64-bit floating-point numbers, they are easily subject to the transformation detailed above, and then converted to the secured and unsecured components. Using 128-bit RSA, however, the secured component will thus be 128 bits in length. With so many components, it may not be necessary to keep all of the individual values of G. Instead, an PK-encryption of the original data could be computed and stored and then a cryptographic digest such as MD5 or SH1 could be computed for each element of G and only a portion of the bits (say 32) used for W. Overall this would save storage in the final secure revocable identity token representation. Alternative, especially if 32-bit floating-point numbers are used, the values of G can be grouped into blocks forming 128 bit data that can then be directly encoded into the same storage. This does mean that a if one element of the group is an outlier such that it impacts G, then all four components will be impacted in the distance computation. But is also reduces the number of encryptions by a factor of 4, and improves overall protection of the data. This tradeoff of space/speed for accuracy may be desired in some embodiments.

To demonstrate the generality of the improvements to be obtained by using robust distance measures in face-based systems, we extended algorithms included in the Colorado State University (CSU) Face Identification Evaluation System (Version 5.0) [Bolme-etal-03]. In particular we developed secure revocable identity token versions of the "baseline" PCA-based face recognition system using multiple metrics, their LDA-based face recognition algorithms and the Elastic Bunch Graph Matcher (EBGM)[Okada-et-al-98]. We used the default size of 300 coefficients for PCA and 427 for LDA. While an individual scaling will produce the best robust measure for that particular individual, it can be problematic in that it presumes multiple images for enrollment. We postulated that for each field, a single scaling could be used for the entire population. This simplifies the enrollment process, allowing for single image enrollment, but does slightly reduce the effectiveness of the robust distance transform. We call this the GroupRobust transform. This approach has worked well for both PCA and LDA with different robust measures. In keeping with the CSU toolkit model, the experiment applied the robust revocable biometric to a gallery of all the FERET data to generate all pair-wise comparisons, and then subsets of that data were analyzed for different "experiments". The standard FERET experiments were done including FAFB, FAFC, DUP1, and DUP2 [Phillips-et-al-00]. The Secured Robust Revocable Biometric consistently outperformed the CSU baseline algorithms as well as all algorithms in the FERET study and all commercial algorithms tested on FERET. Table 2 shows the Rank 1 recognition rates computed for the standard FERET subsets for the algorithms in the CSU toolkit (first six results), the best previously reported [NIST-01] from FERET tests and a range of revocable robust techniques, with a total of over 250 Million biometric comparisons. An obvious issue for the GroupRobust techniques is the definition of the group used for training. We have tested with different groups, all 3541 images, DUP1 (243 subjects, 722 total images), FAFC images (2 each of 194), and the 2 images each of 71 individuals (X2) use to train the FERET PCA space (feret_training_x2.srt from CSU's toolkit), as well as other subsets not show. Note that FAFC has no subjects/images in common with any of DUP1, DUP2 or X2. Also note that differences of 1-2 individual recognitions (e.g. 100 versus 99.48 for FAFC) may be caused by the random "offsets" used to define the secure revocable identity token and are statistically significant.

TABLE 2

Rank 1 Recognition Rates on FERET subsets

| Algorithm | DUP1 | DUP2 | FAFB | FAFC |
|---|---|---|---|---|
| Number of subjects | 243 | 75 | 1195 | 194 |
| Number of Matched scores computed | 479 | 159 | 1195 | 194 |
| Number of Non-matched scores computed | 228K | 25K | 1427K | 37K |
| PCA L2 | 33.79 | 14.10 | 74.31 | 04.64 |
| PCA MahCos | 44.32 | 21.80 | 85.27 | 65.46 |
| LDA ldaSoft | 44.18 | 18.80 | 70.96 | 41.75 |
| Bayesian ML | 51.38 | 31.20 | 81.76 | 34.54 |
| EBGM Predictive | 43.63 | 24.78 | 86.94 | 35.57 |
| EBGM Search | 46.26 | 24.35 | 89.79 | 41.75 |
| FERET "BEST" | 59.1 | 52.1 | 86.2 | 82.1 |
| Revocable Robust PCA | 90.72 | 87.18 | 99.50 | 100.00 |
| Revocable (all) GroupRobust PCA | 86.57 | 85.47 | 98.32 | 100.00 |
| Revocable (DUP1) GroupRobust PCA | 85.46 | 85.47 | 98.24 | 100.00 |
| Revocable (X2) GroupRobust PCA | 83.80 | 83.76 | 97.99 | 99.48 |
| Revocable (FAFC) GroupRobust PCA | 81.85 | 82.05 | 97.15 | 99.48 |
| Revocable Robust PCA MahL2 | 90.72 | 87.18 | 99.50 | 100.00 |
| Revocable Robust PCA MahCosine | 68.14 | 67.52 | 93.97 | 96.39 |
| Revocable Robust LDA | 90.72 | 87.18 | 99.50 | 100.00 |
| Revocable (all) GroupRobust LDA | 88.78 | 85.47 | 98.91 | 100.00 |
| Revocable (X2) GroupRobust LDA | 87.95 | 84.62 | 98.83 | 100.00 |
| Revocable (FAFC) GroupRobust LDA | 81.85 | 81.20 | 98.24 | 99.48 |
| Revocable Robust EBGM Predictive | 91.27 | 88.03 | 100.00 | 100.00 |
| Revocable Robust EBGM Search | 91.27 | 88.03 | 100.00 | 100.00 | d. Signatures. Handwritten signatures are a major source of "identify verification," and variations of on-line signature systems are widely deployed. Various embodiments of the invention utilize handwritten signatures. Feature sets may be dynamic features [8] or static features [9]. Dynamic features may include pressure at pen tip, acceleration, tile and velocity, measured at critical points during the signature process. Static features may include distance and curvature change between successive points on the trajectory. In both cases, global features may also be included, such as total signature time or Fourier descriptors.

As a collection of independent features of at least 1 byte in size, the application of the approach is straightforward. Because of the inherent variation in biometrics, and the need to prevent active forgeries, the space of signature based biometrics generally use multiple samples for enrollment, and store both mean and variance of the measured features in the template. These variations may then be used to threshold the distance of a probe from the template. In applying the approach, the normalization of the data may be embedded within scaling to ensure that each unit of the quotient (for small bit fields) or integer component (for floating point fields) represent between 3 and 4 standard deviations of the scaled data. The issue of small fields generally must be addressed with signatures, again either combining fields or projecting and adding multiple columns.

e. Hand Geometry. Various embodiments of the invention utilize hand geometry systems, which often compute measurements of sizes of various components of the hand or fingers at predefined positions along the contours. An alternative uses projective invariants of particular hand-feature points [10]. Either representation, however, constitutes a collection of individual measurements in fixed correspondence, and hence is easily adapted. Like signature data, normalization based on variance in enrollment may also be applied to hand-geometry data.

REFERENCES

[1] U.S. Pat. No. 6,836,554 B1, "System and method for distorting a biometric for transactions with enhanced security and privacy", Bolle et. al. 2004.

[2] N. Ratha, J. Connell, R. Bolle, "*Enhancing security and privacy in biometrics-based authentication systems*," IBM Systems Journal, vol. 40, no. 3, 614, 618 (2001).

[3] T. Matsumoto, H. Matsumoto, K. Yamada, S. Hoshino, "*Impact of Artificial "Gummy" Fingers on Fingerprint Systems*," Proceedings of SPIE Vol. #4677, Optical Security and Counterfeit Deterrence Techniques IV, January 2002.

[4] J. Cambier, U. Cahn von Seelen, R. Glass, R. Moore, I. Scott, M. Braithwaite, and J. Daugman. "*Application-Specific Biometric Templates*." IEEE Workshop on Automatic Identification Advanced Technologies, Tarrytown, N.Y., Mar. 14-15, 2002, p. 167-171.

[5] P. Huber, "*Robust Statistics*," John Wiley & Sons, New York. 1981.

[6] B. Bhanu and X. Tan, "*Fingerprint Indexing Based on Novel Features of Minutiae Triplets,*" IEEE Transactions on Pattern Analysis and Machine Intelligence, 25:5, Pages: 616-622, May 2003.

[7] D. Zhang, W. Kong, and J. You, "*Online Palmprint Identification,*" IEEE Transactions on Pattern Analysis and Machine Intelligence, Vol. 25, No. 9, 2003, pp. 1041-1050.

[8] V. Nalwa, "*Automatic On-line Signature Verification,*" Proceedings of the IEEE, Vol. 85, pp 215-239, 1997

[9] A. Jain, F. Griess and S. Connell, "*On-line Signature Verification,*" Pattern Recognition, Vol 35, pp 2963-2972, December 2002.

[10] G. Zheng, C. Wang and T. Boult, "*Personal Identification by Cross-Rations of Finger Features,*" Biometrics Challenges from Theory to Practice, Workshop in conjunction with ICPR 2004.

I claim:

1. A method for secure revocable identity tokens, comprising the steps of:
   a) capturing a biometric signature having a plurality of feature vectors;
   b) transforming each of the plurality of feature vectors into a stable portion and a residual part
   c) cryptographically encoding the stable portion to form a secured part and simply transforming the residual portion to be the residual part.

2. The method of claim 1, wherein step (b) further includes the step of:
   b1) transforming at least one of the plurality of feature vectors and dividing it into a most significant bits portion and a least significant bits portion;
   b2) securing the most significant bits portion.

3. The method of claim 1, wherein step (c) includes the step of using a public key encryption to produce at least part of the secured part.

4. The method of claim 1, where it is computationally intractable to recover the original feature vectors from any combination of the secured and the residual part.

5. The method of claim 2, wherein step (b2) includes the step of including a password as part of the process of generating the secured part.

6. The method of claim 5, wherein the password is not stored in a computer readable medium after completion of step (b2).

7. The method of claim 1, further including the steps of:
   c) comparing the secured part of the one of the plurality of feature vectors to an associated secured part of a stored feature vector;
   d) when a closeness measure of the secured parts is within a predetermined threshold, comparing a residual part of the one of the plurality of feature vectors to an associated residual part of the stored feature vector.

8. The method of claim 7, further including the step of:
   e) repeating the comparing steps for all of the plurality of feature vectors to form a closeness score.

9. The method of claim 8, wherein the closeness score is essentially equal to a standard closeness score of the biometric signature.

10. A method for secure revocable identity tokens, comprising the steps of:
    a) receiving a biometric signature having a plurality of feature vectors;
    b) transforming each of the plurality of feature vectors and splitting each into a probe secured part and a probe residual part; and
    c) comparing the probe secured part of one of the plurality of feature vector to a gallery secured part of an associated gallery feature vector.

11. The method of claim 10, further including the step of:
    d) when the probe secured part and the gallery secured part are not equal, assigning a threshold closeness measure.

12. The method of claim 11, further including the steps of:
    e) when the probe secured part and the gallery secured part are equal, measuring a closeness of the residual part to a gallery residual part to form a closeness measure;
    f) when the closeness measure is greater than the threshold closeness measure, assigning the threshold closeness measure.

13. The method of claim 12, further including the step of:
    g) when the closeness measure is not greater than the threshold closeness measure, using the closeness measure.

14. The method of claim 10, wherein step (b) further includes the step of:
    b1) encrypting the probe secured part using a public key encryption.

15. The method of claim 10, wherein step (b) further includes the step of:
    b1) password protecting the probe secured part.

16. A method for secure revocable identification, comprising the steps of:
    a) receiving a probe biometric signature having a plurality of probe feature vectors;
    b) transforming each of the plurality of probe vectors into a secured part and a residual part to form a probe identity token; and
    c) determining a closeness measure between the probe identity token and a gallery identity token.

17. The method of claim 16, wherein the step (b) further includes the step of public key encrypting the secured part.

18. The method of claim 17, wherein step (c) further includes the step of:
    c1) receiving a password.

19. The method of claim 17, wherein step (c) further includes the step of:
    c1) comparing the secured part to a gallery secured part;
    c2) when the secured part and the gallery secured part are not equal, assigning a threshold closeness measure.

20. The method of claim 19, further including the step of:
    c3) when the secured part and the gallery secured part are equal, measuring a closeness of the residual part to a gallery residual part;
    c4) when the closeness measure is greater than the threshold closeness measure, assigning the threshold closeness measure;
    c5) when the closeness measure is not greater than the threshold closeness measure, using the closeness measure.

21. A secure revocable identification method, comprising the steps of:
    a) creating a first identity token having a secure part form a biometric signature; and
    b) creating a second identity token derived from the first identity token without use of the biometric signature, wherein the second identity token is not identical to the first identity token and a transformation from the first identity token increases a potential space associated with the second identity token.

* * * * *